US012451640B2

(12) United States Patent
Freudenberger

(10) Patent No.: US 12,451,640 B2
(45) Date of Patent: Oct. 21, 2025

(54) SOCKET WITH AN EXTENDABLE COLLAR FOR A LUMINAIRE

(71) Applicant: Nimbus Group GmbH, Stuttgart (DE)

(72) Inventor: Sascha Freudenberger, Bietigheim-Bissingen (DE)

(73) Assignee: Nimbus Group GmbH, Stuttgart (DE)

( * ) Notice: Subject to any disclaimer, the term of this patent is extended or adjusted under 35 U.S.C. 154(b) by 365 days.

(21) Appl. No.: 18/301,570

(22) Filed: Apr. 17, 2023

(65) Prior Publication Data

US 2023/0352871 A1 Nov. 2, 2023

(30) Foreign Application Priority Data

Apr. 27, 2022 (DE) ..................... 20 2022 102 254.2

(51) Int. Cl.

*H01R 13/453* (2006.01)
*H01R 13/24* (2006.01)
*H01R 13/514* (2006.01)
*H01R 24/78* (2011.01)
*H01R 103/00* (2006.01)

(52) U.S. Cl.

CPC ..... *H01R 13/4538* (2013.01); *H01R 13/2421* (2013.01); *H01R 13/514* (2013.01); *H01R 24/78* (2013.01); *H01R 2103/00* (2013.01)

(58) Field of Classification Search

CPC .................................................. H01R 13/4538
USPC .................................................. 439/140, 141
See application file for complete search history.

(56) References Cited

U.S. PATENT DOCUMENTS

| | | | | | |
|---|---|---|---|---|---|
| 2,444,843 | A * | 7/1948 | Modrey | H01R 13/4538 | 439/324 |
| 3,147,055 | A * | 9/1964 | Rubens | H01R 13/447 | 439/140 |
| 3,201,740 | A * | 8/1965 | Rubens | H01R 13/447 | 174/67 |
| 3,363,216 | A * | 1/1968 | Benedetto | H01R 13/6395 | 174/67 |
| 3,449,706 | A * | 6/1969 | Carissimi | H01R 13/5227 | 174/67 |
| 4,293,733 | A * | 10/1981 | Royer | H01R 13/44 | 174/67 |

(Continued)

FOREIGN PATENT DOCUMENTS

| | | | |
|---|---|---|---|
| WO | 2019/010613 | A1 | 1/2019 |
| WO | 2020/077371 | A1 | 4/2020 |

*Primary Examiner* — Neil Abrams
(74) *Attorney, Agent, or Firm* — Orbit IP, LLP; Marc G. Martino

(57) ABSTRACT

An electric socket for a mains plug with two contact pins includes a base with a front face having two holes with two contacts arranged behind the holes for electrical contacting a contact pin inserted through. A collar is mounted on the base to be movable from a rear end position into a front end position where the collar protrudes further forwards beyond the front face of the base than in the rear end position and surrounds the front face of the base. An extending mechanism acts at least in the rear end position of the collar and engages between the front face and the contacts in the path of motion of at least one of the two contact pins and is designed to extend the collar out of the rear end position into the front end position by means of the at least one inserted contact pin. Once in the extended position the collar would serve to protect the plug.

17 Claims, 4 Drawing Sheets

(56) References Cited

U.S. PATENT DOCUMENTS

| | | | | | |
|---|---|---|---|---|---|
| 4,391,481 | A * | 7/1983 | Golden | H01R 13/44 | 439/588 |
| 5,067,907 | A * | 11/1991 | Shotey | H01R 13/447 | 174/67 |
| 5,551,884 | A * | 9/1996 | Burkhart, Sr. | H01R 13/44 | 439/140 |
| 5,944,542 | A * | 8/1999 | Lee | H01R 13/4538 | 439/140 |
| 11,329,437 | B2 * | 5/2022 | Hu | H01R 13/7031 | |
| 2023/0352871 | A1 * | 11/2023 | Freudenberger | H01R 13/703 | |

* cited by examiner

SOCKET WITH AN EXTENDABLE COLLAR FOR A LUMINAIRE

CROSS-REFERENCE TO RELATED APPLICATIONS

This application claims priority to German Utility Model Application DE 20 2022 102 254.2, filed Apr. 27, 2022, the entire contents of which are hereby incorporated in full by this reference.

DESCRIPTION

Field of the Invention

The invention relates to an electric socket for a mains plug with at least two contact pins, comprising a base with a front face which has at least two holes, and with at least two contacts arranged behind the holes for electrical contacting of, in each case, a contact pin, inserted through the holes, of the mains plug, and comprising a collar, provided for plugging in the mains plug, which is mounted on the base so as to be movable from a rear end position into a front end position in which the collar protrudes further forwards beyond the front face of the base than in the rear end position and surrounds the front face of the base in the manner of a collar.

Background of the Invention

Such an electric socket with movably mounted collar has become known through WO 2020/077371 A1, for instance. Here, the collar is realized in the manner of a knob or push-button which has been resiliently biased into its extended position by means of springs and can be locked temporarily in its retracted position by means of a releasable detent catch. By being lightly tapped in the retracted position, the collar can be released from its interlocking on the detent catch, and springs into its extended position. Conversely, the collar can be transferred from its extended position back into its retracted position by being pressed against the force of the springs and can then be locked on the detent catch.

SUMMARY OF THE INVENTION

In contrast, the object underlying the present invention is to extend the collar in a different manner in an electric socket of the type mentioned in the introduction.

In accordance with the invention, this object is achieved by an extending mechanism which, on the one hand, acts upon the collar and, on the other hand, engages, at least in the rear end position of the collar, between the front face of the base and the contacts in the path of motion of at least one of the two contact pins, and which is designed to extend the collar from the rear end position into the front end position by means of the at least one inserted contact pin.

In accordance with the invention, the collar is extended from the rear end position into the front end position by insertion of the contact pins of the mains plug into the electric socket.

In preferred embodiments, the extending mechanism comprises a lever arm which is swivel mounted on the base and which at one end acts upon the collar, in particular is joined thereto by articulation, and at the other end protrudes into the path of motion of the at least one contact pin at least in the rear end position of the collar. By virtue of the inserted contact pin, the lever arm is deflected out of the path of motion and, as a result, the collar is extended in the opposite direction to the contact pin. The lever arm may be both swivel mounted and guided in longitudinally displaceable manner, for instance by means of a longitudinal slot on a bearing pin of the base.

Preferably, the collar can be moved from the rear end position into the front end position against the action of a restoring force, in particular in the form of a restoring spring, and has therefore been biased into the rear end position. In the rear end position, the collar preferably terminates flush with the front face of the base to form a plane front side of the electric socket.

Particularly preferably, the electrical connection between at least one of the contacts and an associated terminal contact of an electric socket housing comprises an electrical switch which is actuated by the collar or by the extending mechanism and which is open in the rear end position of the collar and closed at least in the front end position of the collar. By virtue of this measure, it is ensured that the contacts can only be current carrying when the collar has been extended. The electrical switch is preferably closed exclusively in the front end position of the collar, so that the contacts are current carrying only when the collar has been maximally extended. For instance, the electrical switch may comprise a contact spring which is capable of being deflected by the collar or by the extending mechanism and which in the rear end position of the collar has been lifted away from a mating contact of the switch and at least in the front end position of the collar bears against the mating contact in electrically conducting manner.

Preferably, the collar comprises on its inner circumferential side at least one protective contact which cooperates with a protective contact of the mains plug and is permanently electrically connected to an earthing terminal of an electric socket housing, for example by means of a sliding contact. By virtue of this measure, the electric socket is developed into an electric socket with a protective contact.

In preferred embodiments, an electric socket housing comprises the base. The electric socket housing may have a circular or a rectangular—in particular, square—outer contour. Advantageously, the electric socket housing comprises respectively complementary terminal contacts on two mutually opposing sides, in order in this way to be able to connect two electric sockets to one another electrically. Instead of complementary terminal contacts, commercially available clamp terminals or screw terminals may alternatively be present on the electric socket housing and/or on the collar.

The invention also relates to a multiple electric socket with several electric sockets, designed as above, arranged in a row in a U-profile. The electric sockets and the U-profile preferably comprise guides interacting with one another, such as guide grooves and guide projections, by means of which the electric sockets have been pushed into the U-profile and held therein. Advantageously, when two adjacent electric sockets are being pushed together, terminal contacts of the one electric socket contact complementary terminal contacts of the other electric socket, in order in this way to route supply lines from one electric socket to the next electric socket.

Lastly, the invention also relates to a luminaire device with at least one U-profile in which a luminaire and at least one electric socket or multiple electric socket designed as above are accommodated.

The luminaire device preferably has a double U-profile, the luminaire being accommodated in one U-profile, and the at least one electric socket or multiple electric socket being accommodated in the other U-profile of the double U-profile. The luminaire device may, for instance, comprise an LED strip, which has been adhesion-bonded into the U-profile, and a transmissive strip light which closes the U-profile. By virtue of the double U-profile, the luminaire and the electric socket(s) are spatially separated from one another. Depending upon the requirement, several electric sockets or multiple electric sockets as well as further modules can be slid into the U-profile.

Further advantages of the invention arise out of the description, the claims and the drawing. Similarly, the aforementioned features and those specified below may find application, each by itself or severally in arbitrary combinations. The embodiments shown and described are not to be understood as being a definitive listing but rather have exemplary character for the depiction of the invention.

DETAILED DESCRIPTION OF THE PREFERRED EMBODIMENTS

Figure 1A:
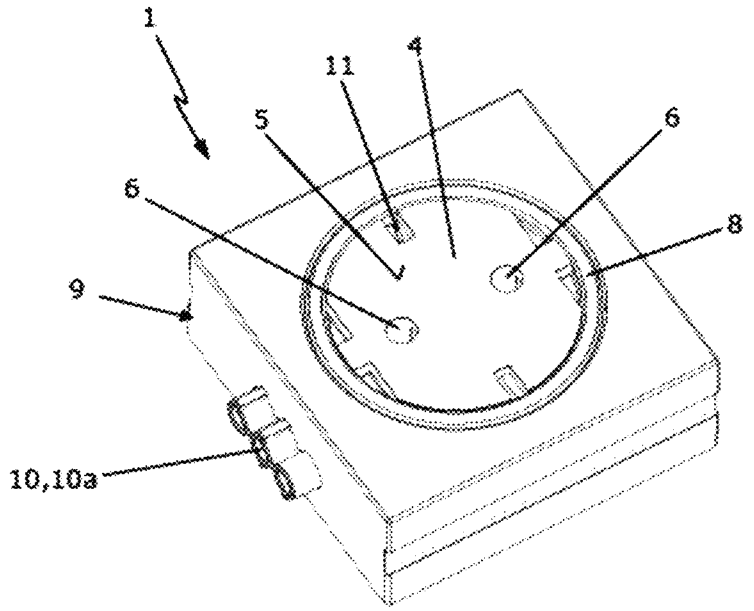
FIGS. 1*a*, 1*b* show an electric socket according to the invention with an extensible collar in a retracted, rear end position (FIG. 1*a*) and in an extended, front end position (FIG. 1*b*), in each instance in a perspective view.
Figure 1B:
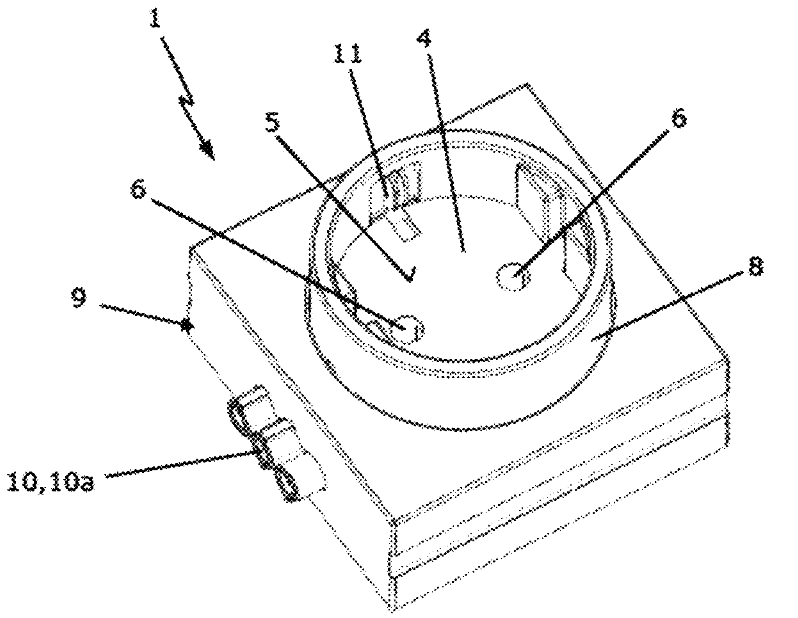

The electric socket 1 shown in FIGS. 1*a*, 1*b* serves for electrical contacting of a mains plug 2 (FIGS. 2*a*-2*e*) which comprises several—here, merely in exemplary manner, two—contact pins 3.

The electric socket 1 has a base 4 with a front face (basal area of the plug) 5, which has several—here, two—holes 6, and with several—here, two—contacts 7 (FIGS. 2*a*-2*e*), for example in the form of bushings, arranged behind the holes 6, for making electrical contact with, in each case, a contact pin 3, inserted through the holes 6, of the mains plug 2, as well as a collar 8, provided for plugging in the mains plug 2, which here, merely in exemplary manner, is annular. The collar 8 is mounted on the base 4 so as to be movable from the rear end position shown in FIG. 1*a* into the front end position shown in FIG. 1*b*, in which the collar 8 protrudes further forwards beyond the front face 5 of the base than in the rear end position and surrounds the front face 5 of the base in the manner of a collar. In its extended position, the collar 8 serves as contact protection for the contact pins 3 of the mains plug 2, so long as these have not yet been fully inserted into the holes 6.

Figure 4A:
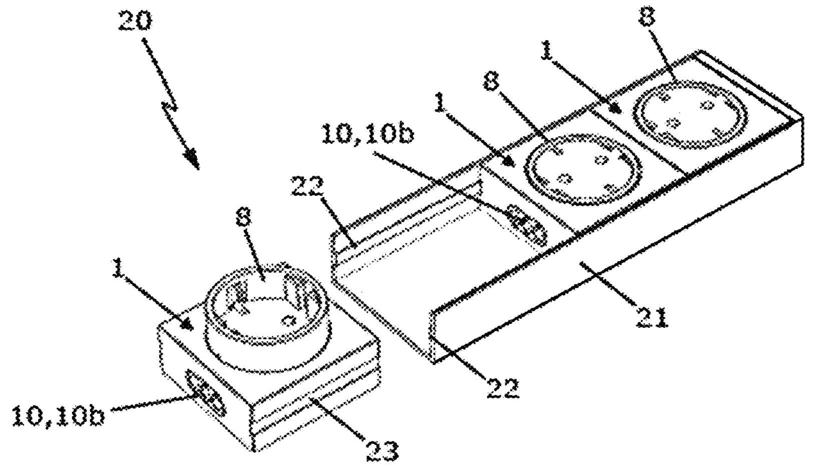
FIGS. 4*a*, 4*b* show a multiple electric socket composed of several electric sockets according to the invention, wherein in FIG. 4*b* all the electric sockets have been slid into a U-profile and in FIG. 4*a* a last electric socket has not yet been slid into the U-profile.
Figure 4B:
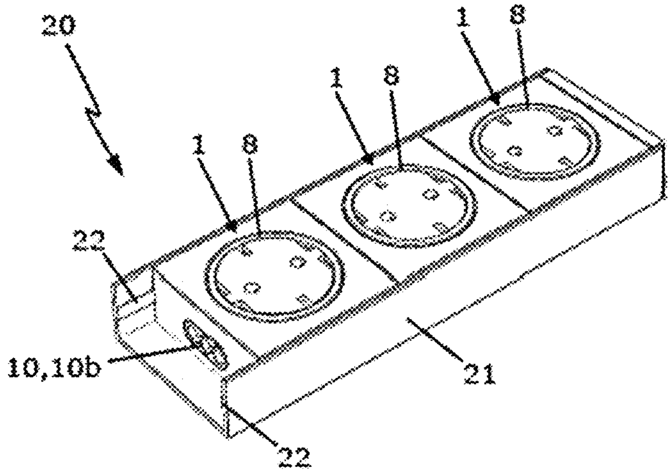

The base 4 is formed by an electric socket housing 9 which here, merely in exemplary manner, has a rectangular—in particular, square—outer contour. The front face 5 of the base is formed by the front side of the electric socket housing 9. The base 4 comprises on two mutually opposing sides in each instance several complementary terminal contacts 10—here, three terminal plugs 10*a* and three terminal sockets 10*b* (FIGS. 4*a*, 4*b*). On its inner circumferential side the collar 8 comprises two protective contacts 11, here in the form of contact springs, each interacting with an electrical protective contact of the mains plug 2, which in each position of the collar 8 are electrically connected to an earthing terminal of the electric socket housing 9—here, to one of the terminal plugs 10*a* and to one of the terminal sockets 10*b*—for example by means of a sliding contact. By virtue of the leading protective contact 11, conductive housing parts of devices are earthed before the contact pins 3 reach the current carrying contacts 7.

Alternatively, the outer contour of the base housing 9 may, for instance, also be of circular design.

Instead of the plug-in terminal contacts 10, 10*a*, 10*b* shown, commercially available clamp terminals or screw terminals may alternatively be present on the electric socket housing 9 and/or on the collar 8.

As shown in FIG. 1*a*, in the rear end position the collar 8 terminates flush both with the front face 5 of the base and with the rest of the front side of the electric socket housing 9.

As shown in FIGS. 2*a*-2*e*, when the mains plug 2 is being plugged into the holes 6 the collar 8 is extended out of the rear end position into the front end position against the action of a restoring spring 13 by means of an extending mechanism 12 actuated by the mains plug 2. When the mains plug 2 is being unplugged, the collar 8 is retracted back into its rear end position by the restoring spring 13. At least in the rear end position of the collar 8 the extending mechanism 12 engages between the front face 5 of the base and the contacts 7 into the path of motion of the two contact pins 3 and is deflected by the inserted contact pins 3 out of the path of motion thereof, as a result of which the collar 8 is extended out of the rear end position into the front end position.

In the embodiment shown, the extending mechanism 12 comprises a lever arm 14 which is swivel mounted on the base 4 and which at one end is joined to the collar 8 by articulation and at the other end, at least in the rear end position of the collar 8, protrudes into the path of motion of the contact pins 3. The lever arm 14 is both swivel mounted and guided in longitudinally displaceable manner on a bearing pin 16 of the base 4 by means of a longitudinal slot 15. The lever arm 14 is preferably made of electrically non-conducting material.

Figure 2A:
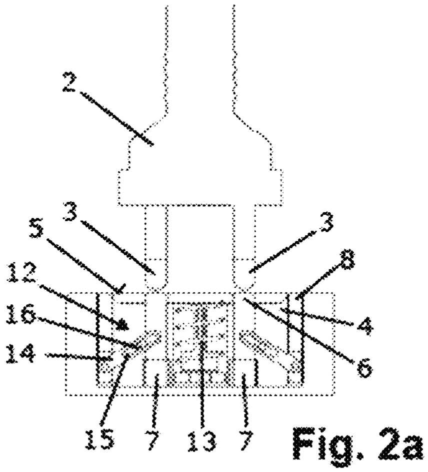
FIGS. 2*a*-2*e* show the extending of the collar, brought about by plugging a mains plug into the electric socket according to the invention, in each instance in a longitudinal section.

In FIG. 2*a*, the contact pins 3 of the mains plug 2 have not been inserted into the holes 6, so the collar 8 is located in its rear end position by reason of the restoring spring 13, and the lever arms 14 protrude into the path of motion of the two contact pins 3 between the front face 5 of the base and the contacts 7.

Figure 2B:
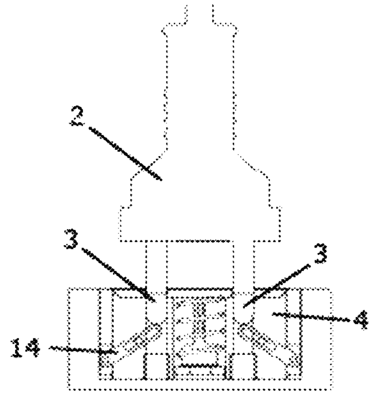

In FIG. 2*b*, the contact pins 3 have been inserted so far into the base 4 through the holes 6 that they bear against the lever arms 14.

Figure 2C:
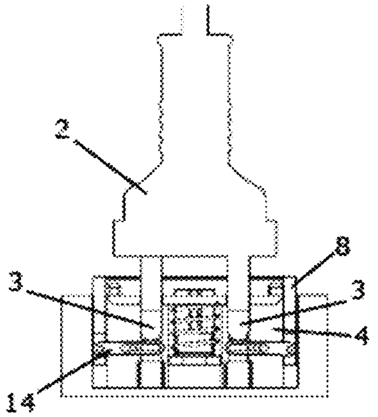

In FIG. 2*c*, the contact pins 3 have been inserted further into the base 4, as a result of which the lever arms 14 have been swivelled about the bearing pins 16 by the contact pins 3 and displaced in the longitudinal slot 15, and the collar 8 joined to the lever arms 14 by articulation has been extended forwards out of its rear end position.

Figure 2D:
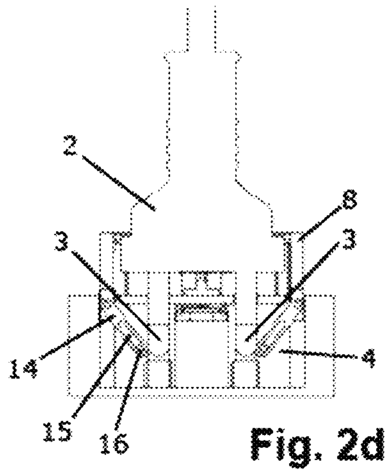

In FIG. 2*d*, the lever arms 14 have been fully deflected out of the path of motion of the contact pins 3 by the further inserted contact pins 3, as a result of which the collar 8 has been extended into its front end position.

Figure 2E:
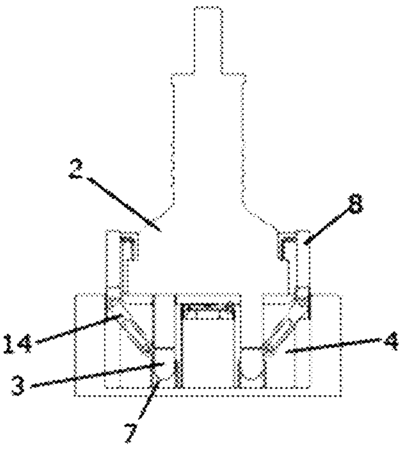

In FIG. 2*e*, the contact pins 3 inserted still further have finally been accommodated in the contacts 7 and thereby electrically contacted, the lever arms 14 bearing externally against the contact pins 3. Contact protection is afforded by virtue of the extended collar 8, which encloses the entire front face 5 of the base, and by virtue of the contacting of the contacts 7, occurring only when the mains plug 2 has been fully inserted.

Figure 3A:
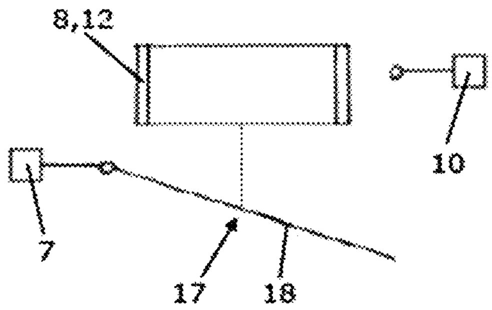
FIGS. 3*a*, 3*b* show schematically an electrical switch, actuated by the collar, of the electric socket according to the invention, which is open in the retracted end position of the collar (FIG. 3*a*) and closed in the extended end position of the collar (FIG. 3*b*)
Figure 3B:
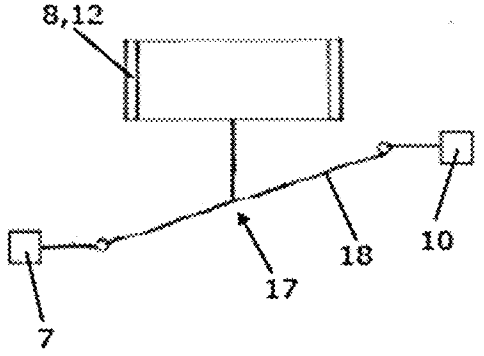

As shown schematically in FIGS. 3*a*, 3*b*, the electrical connections between the contacts 7 and their associated terminal contacts 10 may each comprise an electrical switch 17 which is actuated by the collar 8 or by the extending mechanism 12 and which is closed in the front end position of the collar 8 shown in FIG. 3*b* and open in all other positions of the collar 8, as is shown in FIG. 3*a* for the rear end position of the collar 8. The switch 17 may, for instance, comprise a deflectable contact spring 18 which has been fastened to the contact 7 in electrically conducting manner, the free spring end of which in the front end position of the collar 8 bears against the terminal contact 10 in electrically conducting manner and in all other positions of the collar 8 has been lifted away from the terminal contact 10. In this way, it is ensured that the contacts 7 can be current carrying only in the front end position of the collar 8.

In FIGS. 4*a*, 4*b*, a multiple electric socket 20 composed of several—here, three—electric sockets 1 is shown, wherein in FIG. 4*b* all the electric sockets 1 have been slid into a U-profile 21, and in FIG. 4*a* a last electric socket 1 has not yet been slid into the U-profile 21. The U-profile 21 has interior profile ledges 22 on each of its two mutually opposing profile legs, and the electric socket housing 9 has longitudinal grooves 23 on each of two mutually opposing sides, with which the electric socket housing 9 is guided along the profile ledges 22 of the U-profile 21. When two adjacent electric sockets 1 are being slid together, the terminal contacts 10 of one electric socket 1—that is to say, the terminal plugs 10*a*—engage in the complementary terminal contacts 10 of the other electric socket 1—that is to say, in the terminal sockets 10*b*—as a result of which supply lines are routed onwards from one electric socket 1 to the next electric socket 1.

Figure 5A:
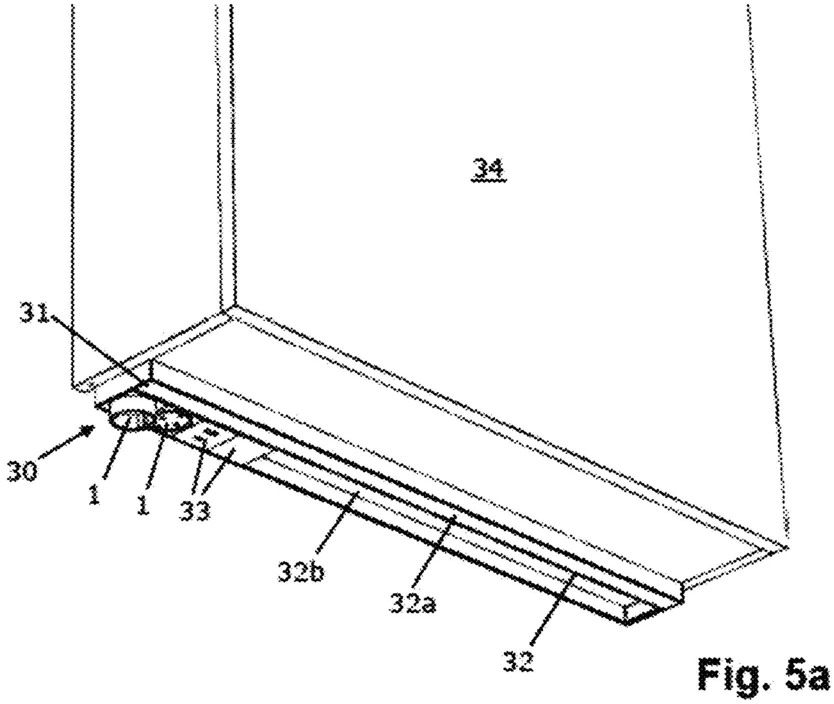
FIGS. 5*a*, 5*b* show a luminaire device with several electric sockets according to the invention.
Figure 5B:
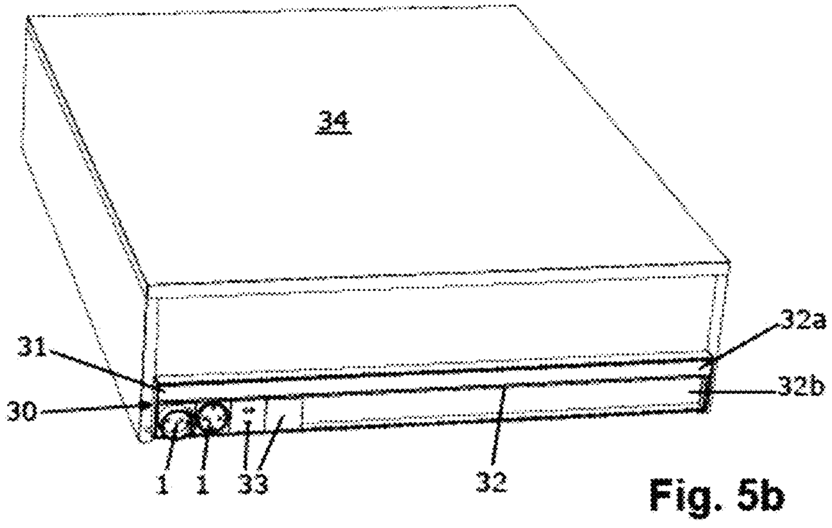

FIGS. 5*a*, 5*b* show a luminaire device 30 with a luminaire 31, with two electric sockets 1 and with a double U-profile 32, the luminaire 31 being accommodated in one U-profile 32*a*, and the electric sockets 1 and further modules 33 having been inserted in the other U-profile 32*b* of the double U-profile 32. The luminaire 31 may, for instance, comprise an LED strip, which is arranged in the U-profile 32*a*, and a transmissive strip light which closes the U-profile 32*a*. In the embodiment shown, the luminaire device 30 is arranged on the underside of an upper cabinet 34.

What is claimed is:

1. An electric socket for a mains plug with at least two contact pins, comprising:
- a base with a front face, which has at least two holes, and with at least two contacts arranged behind the holes for electrical contacting of, in each case, a contact pin, inserted through the holes, of the mains plug; and
- a collar, provided for plugging in the mains plug, which is mounted on the base so as to be movable from a rear end position into a front end position in which the collar protrudes further forwards beyond the front face of the base than in the rear end position and surrounds the front face of the base in the manner of a collar;
- wherein an extending mechanism which, on the one hand, acts upon the collar and, on the other hand, at least in the rear end position of the collar, engages between the front face of the base and the contacts in the path of motion of at least one of the two contact pins, and which is designed to extend the collar out of the rear end position into the front end position by means of the at least one inserted contact pin.

2. The electric socket according to claim 1, wherein the extending mechanism comprises a lever arm which is swivel mounted on the base and which at one end acts upon the collar, and at the other end protrudes into the path of motion of the at least one contact pin at least in the rear end position of the collar.

3. The electric socket according to claim 2, wherein the lever arm is both swivel mounted and guided in longitudinally displaceable manner by means of a longitudinal slot on a bearing pin of the base.

4. The electric socket according to claim 1, wherein the collar is movable out of the rear end position into the front end position against the action of a restoring force.

5. The electric socket according to claim 1, wherein in the rear end position the collar terminates flush with the front face of the base.

6. The electric socket according to claim 1, wherein the electrical connection between at least one of the contacts and an associated terminal contact of an electric socket housing comprises an electrical switch which is actuated by the collar or by the extending mechanism and which is open in the rear end position of the collar and closed at least in the front end position of the collar.

7. The electric socket according to claim 6, wherein the electrical switch is closed exclusively in the front end position of the collar.

8. The electric socket according to claim 6, wherein the electrical switch comprises a contact spring which is deflectable by the collar or by the extending mechanism and which in the rear end position of the collar has been lifted away from a mating contact of the switch and at least in the front end position of the collar bears against the mating contact in electrically conducting manner.

9. The electric socket according to claim 1, wherein the collar comprises on its inner circumferential side at least one protective contact which interacts with a protective contact of the mains plug and which is electrically connected to an earthing terminal of a plug-socket housing.

10. The electric socket according to claim 1, wherein an electric socket housing which includes the base.

11. The electric socket according to claim 10, wherein the electric socket housing has respectively complementary terminal contacts on two mutually opposing sides.

12. The electric socket according to claim 2, wherein the one end of the lever arm is joined to the collar by articulation.

13. The electric socket according to claim 4, wherein the restoring force is formed by a restoring spring.

14. The electric socket according to claim 10, wherein the electric socket housing has a circular, rectangular or square outer contour.

15. A multiple electric socket with several electric sockets according to claim 1, arranged in a row in a U-profile.

16. A luminaire device with at least one U-profile in which a luminaire and at least one electric socket or multiple electric sockets according to claim 1 are accommodated.

17. The luminaire device according to claim 16, wherein the luminaire device comprises a double U-profile, the luminaire being accommodated in one U-profile, and the at least one electric socket or multiple electric sockets being accommodated in the other U-profile of the double U-profile.

* * * * *